May 13, 1924.

C. CYNAMON

LOCK FOR AUTOMOBILES

Filed Aug. 12, 1921

1,494,219

WITNESSES

INVENTOR
CHARLES CYNAMON
BY
ATTORNEYS

Patented May 13, 1924.

1,494,219

UNITED STATES PATENT OFFICE.

CHARLES CYNAMON, OF NEW YORK, N. Y.

LOCK FOR AUTOMOBILES.

Application filed August 12, 1921. Serial No. 491,805.

*To all whom it may concern:*

Be it known that I, CHARLES CYNAMON, a citizen of the United States, and a resident of the city of New York, borough of the Bronx. in the county of Bronx and State of New York, have invented a new and Improved Lock for Automobiles, of which the following is a full, clear, and exact description.

This invention relates to locks for automobiles and has for an object to provide an improved simplified structure which may be readily applied or removed and which, when in use, acts as means for preventing theft of automobiles.

Another object of the invention is to provide a lock for automobiles which will remain constantly at a convenient point for locking the brake and clutch pedals in an inoperative position.

A further object, more specifically, is to provide a lock for automobiles in which a key lock of standard type may be used and special mechanism associated therewith for locking clamping members against certain parts of the automobile for holding the same against operation.

In the accompanying drawings—

Figure 1:
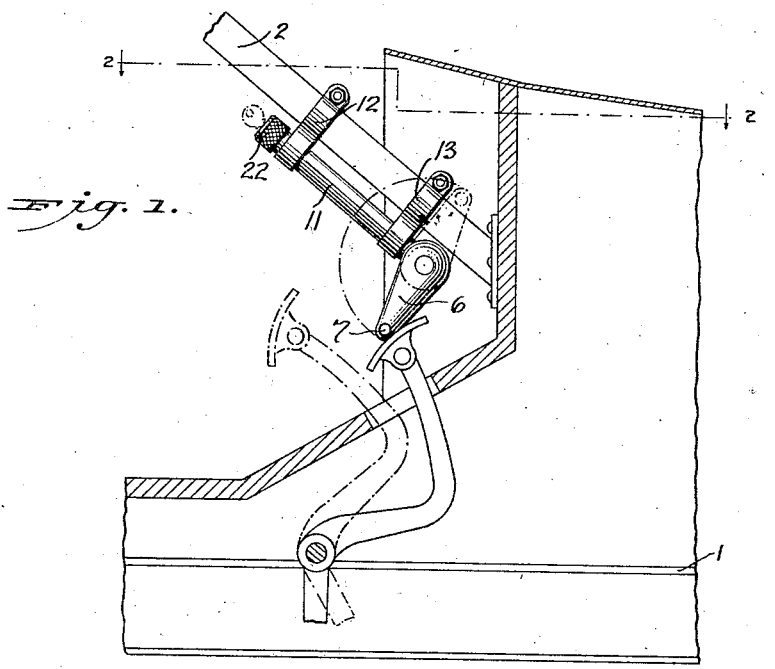
Figure 1 is a fragmentary longitudinal sectional view through an automobile disclosing a lock embodying the invention applied thereto.

Referring to the accompanying drawing by numerals. 1 indicates an automobile of any desired kind provided with a steering post 2 and with pedals 3 and 4 of usual construction connected respectively to the brake and to the clutch. As shown in the drawing, these two pedals when in the dotted position as illustrated in Figure 2 are in their operative position. namely, the clutch is in and the brake is released.

Figure 2:
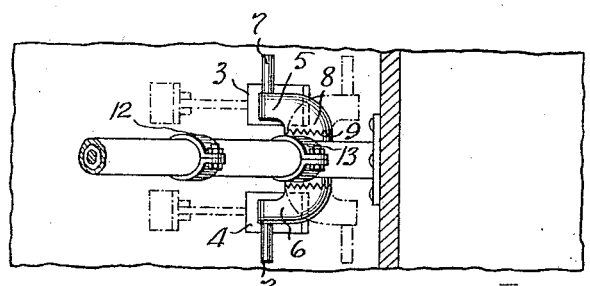
Figure 2 is a sectional view through Figure 1 approximately on line 2—2.

The locking mechanism forming the invention is shown in Figure 2 as holding the pedals in their operated position, namely, the clutch released and the brake applied. When the brake is applied and the clutch is positively held out, it will be impossible to start the automobile even if the engine is started. In order to hold the pedals as shown in Figure 2, locking arms 5 and 6 are provided, each of said arms carrying a pin 7 whereby the arms may be readily manipulated by the foot. Each of these arms is provided with a corrugated or toothed face 8 engaging one of the corrugated or toothed faces 9 on the lock 10, which lock is rigidly secured by threads or otherwise to a tube 11. This tube is provided with clips 12 and 13 which may be welded thereto or otherwise secured in place, said clips having portions fitting around the steering post 2, which portions are bolted, riveted or otherwise rigidly secured in place. When bolts are used. the ends are upset or riveted to prevent easy removal. Each of the arms 5 and 6 is provided with a shaft 14 secured thereto by a pin or otherwise. said shaft extending loosely into an aperture in the block 10 and at the end fitting into block 10 is formed with a reduced neck 15 for receiving one of the link extensions 16 of the locking bar 17. Each of the arms 5 is provided with a bored out portion 18 accommodating the spring 19, which spring acts against the respective arms 5 and 6 and against the block 10 for causing said arms to be moved away from the block and become disengaged therefrom so that the driver may easily manipulate the arms to move the same to an inoperative position as shown in dotted lines in Figure 1 or to the operative position as shown in full lines in Figure 1. It will be noted that the links 16 present a bifurcated end for rod 17 and act to force the pins 14 apart or allow them to move together.

Figure 3:
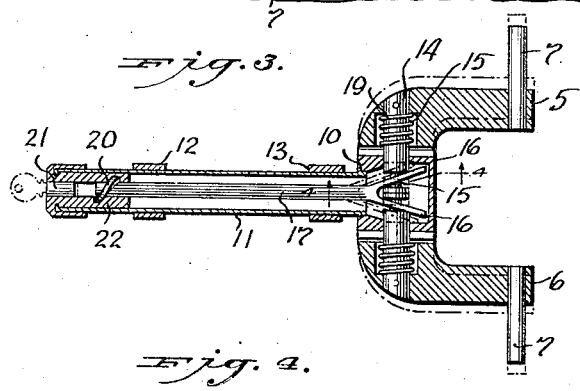
Figure 3 is a longitudinal sectional view through the lock shown in Figure 1.
Figure 4:
Figure 4 is a detail fragmentary sectional view through Figure 3 on line 4—4.

When the arms 5 and 6 are held in the position shown in Figure 3, they are locked against any outward movement and the various corrugations or teeth thereon are held in engagement with the teeth of lock 10. Rod 17 is provided with a steep thread 20 so that whenever the locking mechanism 21 is moved in one direction, the sleeve 22 may be manually rotated and the rod 17 caused to move longitudinally in one direction if desired. The lock 21 may be a lock of any ordinary tumbler type to lock the sleeve 22 against rotation.

What I claim is:—

1. A lock for automobiles comprising a pair of locking arms, one movable independently of the other, for locking the clutch and shift mechanism of the car against actuation, and manually actuated means for locking said arms against movement.

2. In a lock of the character described the combination with an automobile provided with clutch and brake pedals, of a pivoted arm for each of said pedals for holding the pedals in a given position so as to maintain the clutch out and the brake in, said arms being swingable in a vertical plane and engaging the foot section of the pedal and manually operating mechanism for locking said arms rigidly in position.

3. In a lock of the character described, the combination with an automobile provided with brake and clutch pedals, of a pair of independently movable locking arms for supporting said pedals in a given position, each of said arms being formed with a clutch face and being swingable in a vertical plane, said arms engaging the foot section of the pedal, a stationary block formed with a pair of clutch faces adapted to co-act with the clutch faces of said arms, means for bringing said clutch faces into clutching position, and locking means for locking said arms in said locking position.

4. In a lockng device of the character described, the combination with an automobile having brake and clutch pedals, of a locking arm for each of the pedals for holding the pedals in a given position, clutch means for each of said arms, a spring for moving said clutch members into a clutched position, a pair of diverging links for disengaging said clutch members, and a manually actuated locking mechanism for shifting the diverging links.

5. In a locking device of the character described the combination with an automobile provided with brake and clutch pedals, of a locking arm for each of said pedals, each of said locking arms being formed with a clutch face, a stationary block having clutch faces coacting with the first mentioned clutch faces, a rod secured to each of said arms and extending into said block, each of said rods having a reduced neck, a pair of diverging links positioned so that one link will straddle the respective necks of said rods, a reciprocating bar connected with said links, and manually actuated means for moving said bar longitudinally for causing said rods to be shifted and the clutch faces of said arms to be moved into and out of clutching position with said block.

6. In a lock of the character described, the combination with an automobile provided with a clutch pedal and a brake pedal, of a locking arm for each of the pedals for holding the respective pedals in a given position, a stationary block arranged between said arms, clutch means for causing the arms to be interlocked with the block and held rigidly in position, thereby each of said arms being formed with a recess facing the block, a rod secured to each of said arms and extending through said recess into the block, each of said recesses having a reduced neck in the block, said block being hollow, a spring arranged in each of the recesses in said arms and acting on the arms and the block for tending to normally disconnect the arms from the block, means arranged in the block for moving the arms against the block and against the action of said spring, and a manually actuated member for shifting the last mentioned means.

CHARLES CYNAMON.